United States Patent
Miller et al.

(10) Patent No.: US 10,025,302 B2
(45) Date of Patent: Jul. 17, 2018

(54) SYSTEM AND METHOD FOR THE AUTOMATED REMOTE MANAGEMENT OF AN ELECTRONIC CONTROL MODULE

(71) Applicants: Toby W. Miller, Perrysburg, OH (US); Gary A. Percy, Canton, MI (US)

(72) Inventors: Toby W. Miller, Perrysburg, OH (US); Gary A. Percy, Canton, MI (US)

(*) Notice: Subject to any disclaimer, the term of this patent is extended or adjusted under 35 U.S.C. 154(b) by 147 days.

(21) Appl. No.: 15/256,769

(22) Filed: Sep. 6, 2016

(65) Prior Publication Data
US 2018/0017962 A1 Jan. 18, 2018

Related U.S. Application Data

(60) Provisional application No. 62/363,410, filed on Jul. 18, 2016.

(51) Int. Cl.
*B60W 20/00* (2016.01)
*G05D 1/00* (2006.01)
*G07C 5/00* (2006.01)

(52) U.S. Cl.
CPC ........... *G05D 1/0011* (2013.01); *G07C 5/008* (2013.01)

(58) Field of Classification Search
CPC ...... G07C 5/008; G07C 5/085; G07C 5/0808; G07C 5/0816; G07C 5/006; B61L 2205/04; B61L 27/0094; G05D 1/004

USPC .... 701/2, 1, 31.4, 31.5, 29.4, 29.3; 340/439; 318/587

See application file for complete search history.

(56) References Cited

U.S. PATENT DOCUMENTS

| | | | | |
|---|---|---|---|---|
| 5,769,051 A * | 6/1998 | Bayron | ................... | F02P 9/005 123/335 |
| 6,151,549 A * | 11/2000 | Andrews | ............. | F02D 41/0007 180/167 |
| 6,665,606 B2 * | 12/2003 | Mathew | .............. | F02D 41/2487 701/114 |
| 2007/0233349 A1 * | 10/2007 | Segal | ................... | F02D 41/021 701/57 |
| 2017/0308080 A1 * | 10/2017 | Brooks | .................... | A61B 5/18 |

* cited by examiner

*Primary Examiner* — Dalena Tran
(74) *Attorney, Agent, or Firm* — Michael E. Dockins; Shumaker, Loop & Kendrick, LLP

(57) ABSTRACT

A system and method for the automated remote management of an electronic control module wherein the settings, configuration, or operating parameters of an electronic or engine control module may be remotely retrieved, changed, or updated while the engine, vehicle, or transportation system is in operation to allow the change of settings to affect the manner, method, or speed of operation of the engine, vehicle, or transportation system during that operation based on external rules or criteria without the need for manual human input or direction.

20 Claims, 2 Drawing Sheets

SYSTEM AND METHOD FOR THE AUTOMATED REMOTE MANAGEMENT OF AN ELECTRONIC CONTROL MODULE

CROSS-REFERENCE TO RELATED APPLICATIONS

This application claims the benefit of U.S. Provisional Application No. 62/363,410, filed on Jul. 18, 2016. The entire disclosure of the above application is incorporated herein by reference.

FIELD

The present technology relates generally to the retrieval, editing, and manipulation of settings contained within an electronic control module of a vehicle or transportation system. In particular, but not by way of limitation, it further relates to the automated determination of electronic control module settings remotely based on external rules or criteria and while a controlled vehicle or transportation system is in operation.

INTRODUCTION

This section provides background information related to the present disclosure which is not necessarily prior art.

Operation and control of various vehicles can employ one or more types of electronic control modules, also known as electronic control units. For example, dependent and independent electronic control modules can be configured to operate, control, and monitor a variety of aspects of different vehicles powered by various types of power plants, including internal combustion engines. Particular vehicle systems or combinations of vehicle systems can be operated by an electronic control module. Such electronic control modules can include engine control modules, powertrain control modules, transmission control modules, brake control modules, central control modules, central timing modules, general electronic modules, body control modules, and suspension control modules, among others. These electronic control modules can include volatile and/or non-volatile memory, input and output driver circuitry, and a processor capable of executing a stored instruction set, to control the various functions of the vehicle and its associated systems. Particular electronic control modules can communicate with one or more sensors, actuators, and other electronic control units necessary to control various functions, which can include various aspects of engine control, fuel delivery, transmission control, and a myriad of other systems.

Certain systems and subsystems including electronic control modules can have separate electronic control modules that respond to dynamic vehicle situations and initiate appropriate actions. For example, a vehicle can employ a brake control module, a cruise control module, a cooling fan control module, an engine control module, and a transmission control module, such that each vehicle system or subsystem has its own stand-alone electronic control module. These electronic control modules can have little or no communication between each other or with a master control module. Accordingly, the vehicle can be operated as a distributed control system, which can make it difficult to optimize overall vehicle performance by coordinating control of the various control modules for the various systems and subsystems.

As electronic control modules in vehicles are increasingly integrated, the various distributed electronic control modules can communicate status information and coordinate actions therebetween. Capabilities of such integrated electronic control modules allow for more accurate and dynamic vehicle control, including real-time control and adjustment of engine operation, for example. The complexity of the resulting control systems can include the combination of increasingly more control functions into a single module or a dominant electronic control module that coordinates and orchestrates the functions of various electronic control modules of various subsystems.

Advancements in microprocessor technology can facilitate the evolution of electronic control modules. Such electronic control modules operating various vehicle systems initially implemented relatively simple control functions with mechanical apparatus, and progressed to more involved control schemes with dedicated controllers, before having matured as complex control strategies realized by a comprehensive engine controller, for example. Many electronic control modules in vehicles, including engine control modules, however, address only a single subsystem control strategy and fail to capitalize on the advantages afforded by these microprocessor advancements. Another difficulty encountered by distributed electronic control modules, including engine control modules, is the inability to adjust to vehicle operation based on operational requirements that change during travel or between destinations. Distributed electronic control modules also cannot in concert to protect or mitigate vehicle operational aspects from adverse conditions or system failures, including protecting the vehicle's engine or engine components from such issues. Certain engine components, if operated during certain extreme operating conditions, can be damaged or even fail.

Accordingly, there is a need to control and manage one or more electronic control modules in a vehicle as operational or environmental characteristics change, including changes that occur during travel or between destinations and/or in response to operational directives supplied to the vehicle, in order to improve performance, safety, regulatory, and operational aspects of the vehicle.

SUMMARY

The present technology includes systems and processes that relate to management of an electronic control module in a vehicle, including remote management of the electronic control module, where the remote management can be based on automated rules or other criteria.

Systems for automated remote management of an electronic control module in a vehicle are provided that include a first communication device and a vehicle. The first communication device is configured to send a first signal to a second communication device located remotely from the first communication device, where the first signal includes an operational parameter. The vehicle includes the second communication device and an electronic control module. The second communication device is configured to receive the first signal from the first communication device and provide the operational parameter to the electronic control module. The electronic control module is configured to change a physical operational characteristic of the vehicle in response to the operational parameter while the vehicle is in operation.

Methods for automated remote management of an electronic control module in a vehicle are provided that include sending a first signal to from a first communication device to a second communication device located remotely from the first communication device, where the first signal includes an operational parameter. The first signal is received from the first communication device with the second communication device and the operational parameter is provided to an electronic control module, where the second communication device and the electronic control module are onboard a vehicle. A physical operational characteristic of the vehicle is changed using the electronic control module in response to the operational parameter while the vehicle is in operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
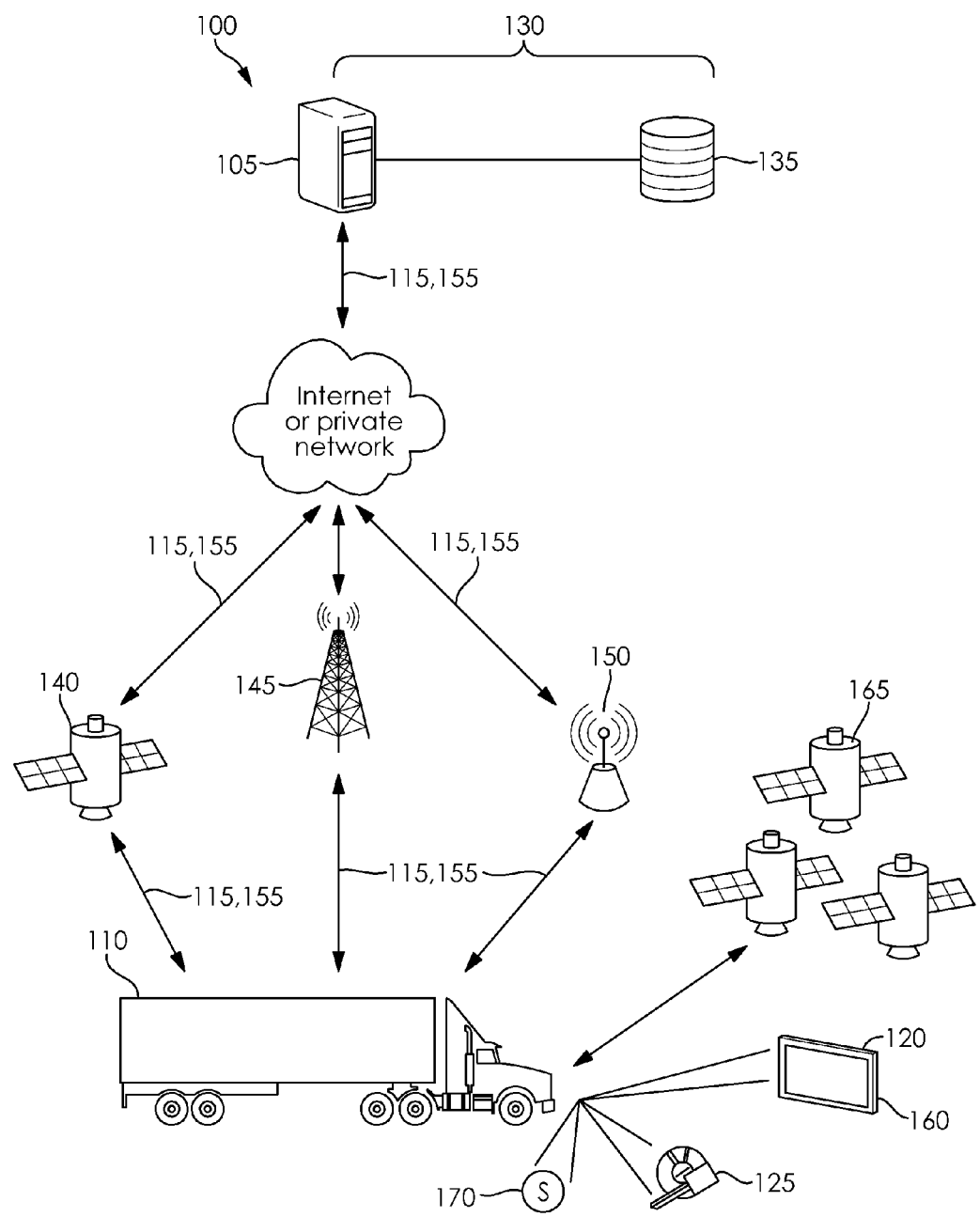
FIG. 1 is a schematic of a system for automated remote management of an electronic control module in a vehicle according to an embodiment of the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. Except where otherwise expressly indicated, all numerical quantities in this description are to be understood as modified by the word "about" and all geometric and spatial descriptors are to be understood as modified by the word "substantially" in describing the broadest scope of the technology.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The present technology provides ways to manage an electronic control module in a vehicle, including automated and remote management of the electronic control module based on one or more rules or criteria. Systems and methods of the present technology enable the automated remote management of an electronic control module where one or more settings, configurations, or operating parameters of one or more electronic control modules can be remotely retrieved, changed, or updated while the vehicle, transportation system, or power plant of the vehicle or transportation system is in operation. Such automated and remote management of one or more electronic control modules can therefore alter a manner, method, or speed of operation of the vehicle, transportation system, or power plant during operation based on external rules or criteria without the need for manual human input or direction. Changes in an operational parameter, including altering one or more settings and/or configurations of one or more control modules, can result in one or more changes in physical operational characteristics of the vehicle, transportation system, or power plant.

The electronic control module can be embedded or onboard the vehicle, transportation system, or power plant, where the electronic control module controls one or more physical aspects thereof. Examples of electronic control modules include engine control modules, powertrain control modules, transmission control modules, brake control modules, electronic power steering control modules, speed control modules, central control modules, central timing modules, general electronic modules, body control modules, suspension control modules, door control modules, and seat control modules, among others. The electronic control module is sometimes referred to generically as an electronic control unit and can be specifically referred to using a functionally specific name prefix with the words "control module" or "control unit" appended to the end, as per the examples listed herein.

The electronic control module can include volatile and/or non-volatile memory, input and output driver circuitry, and a processor capable of executing a stored instruction set, where the electronic control module is configured to control various functions of the vehicle, transportation system, or power plant and associated systems. A particular electronic control module can communicate with numerous sensors, actuators, and other electronic control units necessary to control various functions, which can include various aspects of engine control, fuel delivery, transmission control, and a myriad of other systems. In certain embodiments, the electronic control module can include a microcontroller or microprocessor, some form of volatile and/or non-volatile memory (e.g., FLASH, RAM, DRAM, SRAM, EEPROM, read-only memory, etc.), an input mechanism (e.g., voltage, digital input, analog input, etc.), an output mechanism (e.g., logic output, relay drivers, injector drivers, display, etc.), a communication link, and a protective housing. Optional elements can include some form of temporary or permanent storage (e.g., FLASH, SSD, hard drive, etc.). Examples of non-volatile memory include various non-transitory computer-readable media, where the term "non-transitory," as used herein, is a limitation of the medium itself (i.e., tangible, not a signal) as opposed to a limitation on data storage persistency (e.g., RAM vs. ROM).

The electronic control module of any particular system can typically have one or more operational parameters (e.g., settings, variables, fields, or control values) that affect operation of the respective system. These operational parameters control various attributes during operation of the system, where an engine control module for example can change various physical operational characteristics such as engine RPM, idling, air/fuel mixture, timing, exhaust, emissions controls, and more. The electronic control module can include an on-board diagnostic (OBD) system that allows operating history, operational parameters, and other diagnostic information to be accessed via wired or wireless communication.

The present technology overcomes issues with requiring the vehicle, transportation system, or power plant to be in a stopped or non-operational state in order to change one or more electronic control module operational parameters. Typically such operational parameters of the electronic control module are changed by a mechanic, engineer, or technician with the use of custom software or electronics, or through the use of a standard on-board diagnostic tool while the vehicle, transportation system, or power plant is physically located in a maintenance facility or otherwise not in use. What is more, electronic control modules can include restrictions, limitations, or lockouts which prevent operational parameters from being changed while the vehicle is in operation. The present technology overcomes these issues by allowing automated remote management of the electronic control module in the vehicle, transportation system, or power plant to change a physical operational characteristic thereof.

Operational parameters of the electronic control module can significantly affect optimal performance, operating safety, and wear on the respective system or subsystem of the vehicle, transportation system, or power plant. Appropriate management of these operational parameters can maximize various aspects of the vehicle, transportation system, or power plant, including fuel economy, safe operating speed, engine operating lifetime, etc. The ability to remotely manage one or more electronic control modules, and even automatically remotely manage the one or more electronic control modules, can advantageously maximize the efficiency of the vehicle, transportation system, or power plant. Automated remote management can also serve to automatically protect mechanical components of the vehicle, transportation system, or power plant when an issue arises or performance is compromised in some fashion. Automated remote management can further maintain vehicle, transportation system, or power plant compliance with transportation rules (e.g., emissions, speed, load limits, etc.) while the vehicle, transportation system, or power plant is in operation and passing through various environmental or geographic conditions (e.g., changes in temperature, precipitation, elevation, road surface, etc.) or jurisdictional boundaries (e.g., local, state, and international borders).

Operational parameters can therefore be remotely and automatically supplied to a vehicle, transportation system, or power plant based on predetermined rules or criteria, including changes that occur during travel or between destinations and/or in response to operational directives supplied to the vehicle, in order to improve performance, safety, regulatory, and operational aspects of the vehicle. The operational parameter can be the output of a flowchart or decision tree, where a remote computer system or server receives a signal from the vehicle, transportation system, or power plant and the signal includes information that is automatically processed according to the programmed flowchart or decision tree, and a signal is then sent to the vehicle, transportation system, or power plant including a new operational parameter for an electronic control module. The electronic control module can then change a physical operational characteristic of the vehicle, transportation system, or power plant in response to the operational parameter. In this way, the present technology allows vehicle, transportation system, or power plant systems to be adjusted remotely or while the engine or vehicle is in operation. Changing one or more physical operational characteristics of the vehicle, transportation system, or power plant automatically and remotely overcomes issues with using non-optimal operational parameters. Such non-optimal operational parameters are unfortunately commonplace in many vehicles and transportation systems, as absent the present technology, it is common to implement default settings that consider median or average operational parameters that do not automatically change based on field conditions. As further detailed herein, aspects or features made in reference to a vehicle can also apply to various types of transportation systems or power plants.

In certain embodiments, systems for automated remote management of an electronic control module in a vehicle are provided. Such systems can include a first communication device and a vehicle. The first communication device can be configured to send a first signal to a second communication device located remotely from the first communication device, where the first signal includes an operational parameter. The vehicle can include the second communication device, where the second communication device can be configured to receive the first signal from the first communication device and can provide the operational parameter to an electronic control module. The electronic control module can be configured to change a physical operational characteristic of the vehicle in response to the operational parameter while the vehicle is in operation.

The first communication device can include a computer system having a non-volatile memory, where the non-volatile memory includes the operational parameter. The computer system can store a plurality of operational parameters and can include one or more parameters that are the output of a flowchart or decision tree that automates the selection of the operational parameter. In particular, the non-volatile memory of the computer system can include a plurality of operational parameters. One or more of the operational parameters can be sent in the first signal from the first communication device to the second communication device. The first communication device and the second communication device can each be configured to send and receive one or more signals wirelessly using a satellite network, a cellular data network, and/or a wireless internet network, for example. The first communication device can therefore be configured to send a first signal as a wireless signal to the second communication device and the second communication device can be configured to send a second signal to the first communication device.

One or more signals including one or more operational parameters sent from the first communication device to the second communication device are then provided to one or more electronic control modules. In this way, for example, a remote computer system can provide an operational parameter in the first signal sent by the first communication device to the second communication device remotely located onboard the vehicle. The one or more electronic control modules can then change one or more physical operational characteristics of the vehicle in response to the one or more operational parameters while the vehicle is in operation. Electronic control modules receiving the one or more operational parameters can be configured to operate as a powertrain control module, an engine control module, a transmission control module, a brake control module, a speed control module, a cooling system control module, a suspension control module, a power steering control module, a body control module, a seat control module, and combinations thereof.

The vehicle can include a global positioning system receiver configured to provide a position parameter to the second communication device. The second signal sent from the second communication device onboard the vehicle to the first communication device can therefore include the position parameter. The operational parameter provided from the first communication device in the first signal sent to the remotely located second communication device on the vehicle can be dependent on this position parameter. For example, the position parameter can include one or more of a latitude, a longitude, an elevation, a speed, a travel direction, and a time. The position parameter therefore identifies a location, travel characteristic, or time in which the vehicle is in operation. A computer system linked to or configured as part of the first communication device can automatically process the position parameter(s) using various rules or criteria (e.g., flowchart, decision tree, etc.) and automatically provide an operational parameter(s) to be sent ultimately to the electronic control module(s). For example, a speed control module can be automatically and remotely controlled depending on the location of the vehicle (e.g., freeway versus surface roads), an engine control module can be automatically and remotely controlled to adjust emissions based on jurisdictional boundaries (e.g., local, state, and international borders) or adjust air/fuel mixtures based on elevation of the vehicle, and a suspension control module can automatically and remotely adjust vehicle ride quality depending on a loading of the vehicle and transit to a particular destination.

Other examples include where the vehicle includes one or more sensors configured to provide an operational status to the second communication device. The sensor can be part of or in communication with the electronic control module, as well. The second signal from the second communication device to the first communication device can include the operational status. The operational parameter ultimately sent back and received by the electronic control module can be dependent on the operational status. In particular, the sensor and/or electronic control module can provide the operational status to the second communication device, which may identify a system issue or include an error code, which is sent in the second signal to the first communication device. The first communication device, including the computer system linked to or configured as part of the first communication device, can then automatically process the operational status to send back and provide the operational parameter to the electronic control module to change the physical operational characteristic of the vehicle. The change can update performance of the electronic control module and associated system and/or provide a mitigating function to offset a system issue or error code contained in the operational status. These actions can allow the present system for automated remote management of the electronic control module to reduce or prevent any decreased operational performance of the vehicle or even reduce or prevent damage to the vehicle while in operation. Examples of the operational status include one or more of an error code, a temperature, a pressure, a fluid level, and an emissions parameter.

In certain embodiments, methods for automated remote management of an electronic control module in a vehicle are provided. Such methods can include sending a first signal to from a first communication device to a second communication device located remotely from the first communication device, the first signal including an operational parameter. The first signal is received from the first communication device with the second communication device and the operational parameter is provided to an electronic control module, where the second communication device and the electronic control module are onboard a vehicle. A physical operational characteristic of the vehicle is changed using the electronic control module in response to the operational parameter while the vehicle is in operation. The method can further include sending a second signal from the second communication device to the first communication device. Features and aspects of the present methods also include and employ the various features and aspects of the present systems as described herein.

The present technology provides several benefits and advantages. Remote control and automatic management of an electronic control module based on a set of parameters or information based on the location of the vehicle, the type of cargo being transported, the weather, or other factors enables real-time and dynamic optimization of vehicle operation. For example, the electronic control module can be modified for speed limit changes along a path of travel, can control a maximum speed regardless of location, or can alter speed or shutdown a vehicle when entering restricted areas (e.g., school zones or near hospitals and the like). The path of travel or speed of travel can be altered based on whether the vehicle is transporting manufactured goods, medical waste, or radioactive waste, for example. By being able to remotely control an electronic control module based on the type of cargo and/or location, efficiency of travel is increased, thereby saving on fuel costs. Furthermore, a predictability of travel time is increased. Insurance savings can also be realized due to an increase in such efficiencies and a decrease in speed-related incidents.

EXAMPLES

With reference to FIG. 1, an embodiment of a system for automated remote management of an electronic control module in a vehicle is shown at 100. The system 100 includes a first communication device 105 and a vehicle 110. The first communication device 105 is configured to send a first signal 115 to a second communication device 120 located remotely from the first communication device 105. The first signal 115 includes an operational parameter. The vehicle 110 includes the second communication device 120 and an electronic control module 125. The second communication device 120 and the electronic control module 125 are depicted separately from the vehicle 110 in the schematic of FIG. 1, but it is understood that the second communication device 120 and the electronic control module 125 are onboard the vehicle 110, whether integrated as part of the vehicle 110 or removably coupled to the vehicle 110. The second communication device 120 is configured to receive the first signal 115 from the first communication device 105 and provide the operational parameter to the electronic control module 125. The electronic control module 125 is configured to change a physical operational characteristic of the vehicle 110 in response to the operational parameter while the vehicle 110 is in operation.

The first communication device 105 includes a computer system 130 having a non-volatile memory 135, where the non-volatile memory 135 includes the operational parameter amongst a plurality of operational parameters. The first communication device 105 is configured to send the first signal 115 as a wireless signal using one or more of a satellite network 140, a cellular data network 145, and a wireless internet network 150.

The second communication device 120 can be in communication with one or more electronic control modules 125 onboard the vehicle 110. Any given electronic control module 125 onboard the vehicle 110 can be in communication with other electronic control modules 125. In this way, the electronic control module 125 can independently control a particular system or multiple systems of the vehicle 110. The electronic control module 125 is configured to operate as one of a powertrain control module, an engine control module, a transmission control module, a brake control module, a speed control module, a cooling system control module, a suspension control module, a power steering control module, a body control module, a seat control module, and combinations thereof.

The second communication device 120 is configured to send a second signal 155 to the first communication device 105 and the first communication device 105 is configured to receive the second signal 155 from the second communication device 120. The vehicle 110 includes a global positioning system receiver 160 configured to provide a position parameter to the second communication device 120 based upon information obtained from global positioning system satellites 165. As shown, the global positioning system receiver 160 is integrated with the second communication device 120, but the global positioning system receiver 160 can be separate and hardwired or wirelessly communicate with the second communication device 120. The second signal 155 sent from the second communication device 120 to the first communication device 105 can include the position parameter. The operational parameter provided via the first signal 115 to the electronic control module 125 can be automatically obtained from the computer system 130 having the non-volatile memory 135, where the operational parameter can be dependent on the position parameter provided via the second signal 155. The position parameter can be one of a latitude, a longitude, an elevation, a speed, a travel direction, a time, and combinations thereof. In this way, the system 100 can automatically and remotely manage the electronic control module 125 of the vehicle 110 by providing a particular operational parameter in response to a particular position parameter.

The vehicle includes at least one sensor 170 configured to provide an operational status to the second communication device 120. The sensor 170 is depicted separately from the vehicle 110 in the schematic of FIG. 1, but it is understood that the sensor 170 is onboard the vehicle 110, whether integrated as part of the vehicle 110 or removably coupled to the vehicle 110. The sensor can also be integrated with the second communication device 120. The operational status provided by the sensor 170 is sent via the second signal 155 to the first communication device 105. The operational parameter provided via the first signal 115 to the electronic control module 125 can be automatically obtained from the computer system 130 having the non-volatile memory 135, where the operational parameter can be dependent on the operational status provided via the second signal 155. The operational status can be one of an error code, a temperature, a pressure, a fluid level, an emissions parameter, and combinations thereof. In this way, the system 100 can automatically and remotely manage the electronic control module 125 of the vehicle 110 by providing a particular operational parameter in response to a particular operational status.

Figure 2:
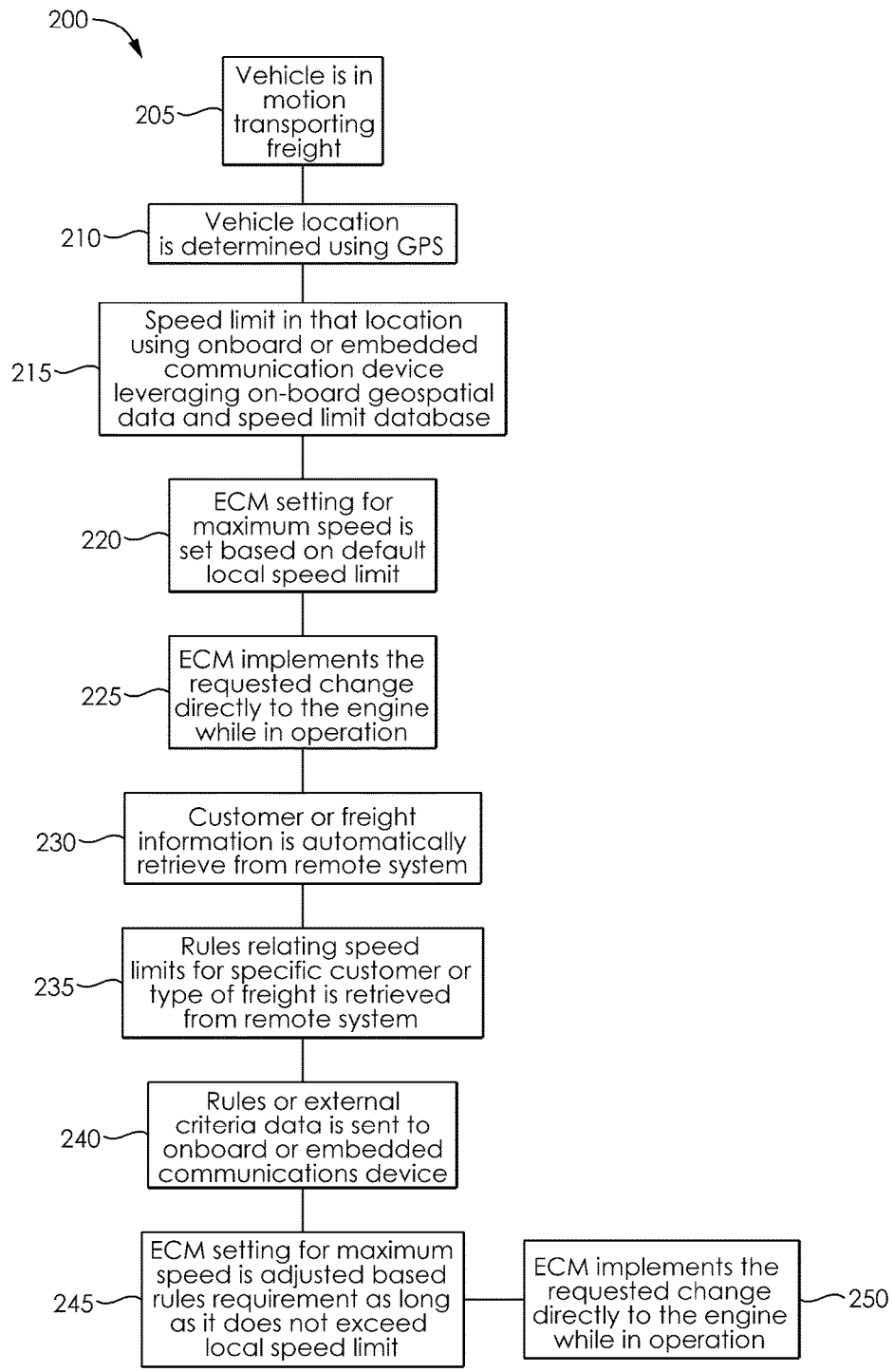
FIG. 2 is a flowchart of a method of automated remote management of an electronic control module in a vehicle including and parameters related to speed using remote rules and criteria according to an embodiment of the present technology.

With reference to FIG. 2, an embodiment of a method for automated remote management of an electronic control module in a vehicle is shown at 200. The method 200 can employ the system 100 for automated remote management of an electronic control module in a vehicle 110, as shown in FIG. 1. At step 205, the vehicle 110 is operating and is in motion transporting freight. At step 210, the location of the vehicle 110 is determined from the global positioning system satellites 165. The vehicle 110 includes a global positioning system receiver 160 configured to provide a position parameter to the second communication device 120 based upon information obtained from the global positioning system satellites 165. The second signal 155 sent from the second communication device 120 to the first communication device 105 includes the position parameter.

At step 215, a speed limit for the vehicle 110 is determined based on a location provided by the global positioning system satellites 165 and a speed limit database. To achieve this, the first communication device 105 includes a computer system 130 having a non-volatile memory 135, where the non-volatile memory 135 includes the operational parameter (i.e., the speed limit for the vehicle) amongst a plurality of operational parameters. The operational parameter provided via the first signal 115 to the electronic control module 125 is automatically obtained from the computer system 130 having the non-volatile memory 135, where the operational parameter is dependent on the position parameter (i.e., location of the vehicle 110) provided via the second signal 155.

At step 220, the operational parameter relating to maximum speed is provided to the electronic control module (ECM) 125 based on a local speed limit determined from the location provided by the global positioning system satellites 165 and a speed limit database stored in the non-volatile memory 135. Thus, the second signal 155 including the position parameter (i.e., location of the vehicle 110) results in the computer system 130 automatically and remotely providing the operational parameter (i.e., the speed limit for the vehicle) to the electronic control module 120 onboard the vehicle 110.

At step 225, the electronic control module 125 implements the requested speed control change to the engine of the vehicle 110 while the vehicle 110 is in operation; i.e., the electronic control module 125 receives the operational parameter (i.e., the speed limit for the vehicle) and communicates with or is configured as a speed control module to change the operational speed limit of the vehicle 110 (i.e., changing a physical operational characteristic of the vehicle 110).

At step 230, customer or freight information stored on the non-volatile memory 135 is automatically retrieved from the remote computer system 130. The the non-volatile memory 135, as part of the computer system 130, includes the operational parameter (i.e., the customer or freight information) amongst a plurality of operational parameters. At step 235, rules relating to speed limits for a specific customer or type of freight stored on the non-volatile memory 135 are retrieved from the remote computer system 130.

At step 240, rules or external criteria data, as one or more operational parameters, are sent to the second communication device 120 onboard the vehicle 110 and provided to one or more electronic control modules 125. At step 245, the electronic control module 125 setting for maximum speed is adjusted based on the rules requirement as long as the local speed limit is not exceeded. That is, the electronic control module 125 changes the physical operational characteristic of the vehicle 110 relating to maximum speed of the vehicle 110.

At step 250, the electronic control module 125 implements the change directly to the engine while in operation. For example, the operational parameter received by the electronic control module 125 results in the electronic control module 125 changing the physical operational characteristic of the vehicle's 110 speed and engine operation while the vehicle 110 is in operation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for automated remote management of an electronic control module in a vehicle comprising:
    a first communication device configured to send a first signal to a second communication device located remotely from the first communication device, the first signal including an operational parameter; and
    a vehicle including:
        the second communication device, the second communication device configured to receive the first signal from the first communication device, provide the operational parameter to an electronic control module, and send a second signal to the first communication device, wherein the first communication device is configured to receive the second signal from the second communication device;
        the electronic control module configured to change a physical operational characteristic of the vehicle in response to the operational parameter while the vehicle is in operation; and
        a global positioning system receiver configured to provide a position parameter to the second communication device, wherein the second signal includes the position parameter, and the operational parameter is dependent on the position parameter.

2. The system of claim 1, wherein the first communication device includes a computer system having a non-volatile memory, the non-volatile memory including the operational parameter.

3. The system of claim 2, wherein the non-volatile memory includes a plurality of operational parameters.

4. The system of claim 1, wherein the first communication device is configured to send the first signal as a wireless signal.

5. The system of claim 4, wherein the wireless signal is configured to be sent using a member selected from the group consisting of a satellite network, a cellular data network, a wireless internet network, and combinations thereof.

6. The system of claim 1, wherein the electronic control module is configured to operate as a member of the group consisting of a powertrain control module, an engine control module, a transmission control module, a brake control module, a speed control module, a cooling system control module, a suspension control module, a power steering control module, a body control module, a seat control module, and combinations thereof.

7. The system of claim 1, wherein the position parameter is a member selected from the group consisting of a latitude, a longitude, an elevation, a speed, a travel direction, a time, and combinations thereof.

8. The system of claim 1, wherein the vehicle includes a sensor configured to provide an operational status to the second communication device, the second signal includes the operational status, and the operational parameter is dependent on the operational status.

9. The system of claim 8, wherein the operational status is a member selected from the group consisting of an error code, a temperature, a pressure, a fluid level, an emissions parameter, and combinations thereof.

10. The system of claim 1, wherein the operational parameter is further dependent on a type of cargo being transported by the vehicle.

11. The system of claim 1, wherein the operational parameter is further dependent on an environmental condition.

12. The system of claim 11, wherein the environmental condition is a member selected from the group consisting of a change in temperature, precipitation, an elevation, and a road surface.

13. The system of claim 1, wherein the operational parameter is further dependent on a jurisdictional boundary.

14. A method for automated remote management of an electronic control module in a vehicle comprising:
    sending a first signal from a first communication device to a second communication device located remotely from the first communication device, the first signal including an operational parameter;
    sending a second signal from the second communication device to the first communication device;
    receiving the first signal from the first communication device with the second communication device and providing the operational parameter to an electronic control module, the second communication device and the electronic control module onboard the vehicle; and changing a physical operational characteristic of the vehicle using the electronic control module in response to the operational parameter while the vehicle is in operation, wherein the vehicle includes a global positioning system receiver configured to provide a position parameter to the second communication device, the second signal includes the position parameter, and the operational parameter is dependent on the position parameter.

15. The method of claim 14, wherein the first communication device includes a computer system having a non-volatile memory, the non-volatile memory including the operational parameter.

16. The method of claim 15, wherein the non-volatile memory includes a plurality of operational parameters.

17. The method of claim 14, wherein the first signal is sent as a wireless signal that is sent using a member selected from the group consisting of a satellite network, a cellular data network, a wireless internet network, and combinations thereof.

18. The method of claim 14, wherein the electronic control module is configured to operate as a member of the group consisting of a powertrain control module, an engine control module, a transmission control module, a brake control module, a speed control module, a cooling system control module, a suspension control module, a power steering control module, a body control module, a seat control module, and combinations thereof.

19. The method of claim 14, wherein the position parameter is a member selected from the group consisting of a latitude, a longitude, an elevation, a speed, a travel direction, a time, and combinations thereof.

20. The method of claim 14, wherein the vehicle includes a sensor configured to provide an operational status to the second communication device, the second signal includes the operational status, and the operational parameter is dependent on the operational status.

* * * * *